United States Patent [19]
Pohl et al.

[11] Patent Number: 5,618,872
[45] Date of Patent: Apr. 8, 1997

[54] INORGANIC FILLERS AND ORGANIC MATRIX MATERIALS WITH REFRACTIVE INDEX ADAPTATION

[75] Inventors: Ludwig Pohl, Darmstadt; Kurt Marquard, Reinheim; Günter Waitl, Regensburg; Ulrike Reeh; Ernst Wipfelder, both of München, all of Germany

[73] Assignees: Merck Patent Gesellschaft mit beschrankter Haftung, Darmstadt; Siemens AG, Munich, both of Germany

[21] Appl. No.: 351,318

[22] PCT Filed: Jun. 9, 1993

[86] PCT No.: PCT/EP93/01467

§ 371 Date: Dec. 9, 1994

§ 102(e) Date: Dec. 9, 1994

[87] PCT Pub. No.: WO93/25611

PCT Pub. Date: Dec. 23, 1993

[30] Foreign Application Priority Data

Jun. 12, 1992 [DE] Germany ............ 42 19 287.0

[51] Int. Cl.[6] ................ C08K 3/22; G02B 5/20
[52] U.S. Cl. ............ 524/430; 524/265; 524/431; 523/205; 523/212; 252/582; 252/584
[58] Field of Search .................. 524/430, 431, 524/265; 252/582; 523/212, 216

[56] References Cited

U.S. PATENT DOCUMENTS 2,304,754  12/1942  Wainer ........................ 524/430
5,008,305   4/1991  Kennan et al. ................ 523/212
5,045,574   9/1991  Kawata et al. ................ 524/268
5,153,251  10/1992  Lupinski et al. .............. 524/265
5,189,902   3/1993  Groeninger ................... 73/24.06
5,190,698   3/1993  Coltrain et al. .............. 524/430
5,270,353  12/1993  Nakano et al. ................ 523/216
5,278,204   1/1994  Tojo et al. .................. 523/212
5,478,878  12/1995  Nagaoka et al. ............... 524/430

FOREIGN PATENT DOCUMENTS 0236945  5/1987  European Pat. Off. .
1263131  4/1988  Japan .
1247928  7/1986  U.S.S.R. .

Primary Examiner—Tae Yoon
Attorney, Agent, or Firm—Millen, White, Zelano, & Branigan, P.C.

[57] ABSTRACT

The invention relates to the use of momodisperse, non-porous, spherical particles based on $SiO_2$, $TiO_2$, $ZrO_2$, $Al_2O_3$, $V_2O_5$, $Nb_2O_5$ or mixed systems thereof, which are optionally modified on the surface by covalently bonded organic groups, as fillers in organic matrix materials, the refractive index of the particles being adapted to the refractive index of the organic matrix according to the use.

Polymeric or polymerizable systems which comprise these particles can be used, for example, as embedding compositions for optical, electro-optical and optoelectronic components. Such embedding compositions show an improved optical homogeneity. Light-emitting diodes produced with them are distinguished, inter alia, by an improved light yield.

15 Claims, No Drawings

INORGANIC FILLERS AND ORGANIC MATRIX MATERIALS WITH REFRACTIVE INDEX ADAPTATION

The invention relates to inorganic fillers and organic matrix materials with refractive index adaptation. Organic materials in which inorganic fillers are incorporated appear in many industrial uses. In these cases, the inorganic fillers often not only have a replacement and dilution function, but serve to modify the organic matrix material or impart to these initially certain properties. In many cases, especially if optical phenomena or effects play a role during application or use, use-specific adaptation of the optical refractive indices of filler and matrix material is desirable or even necessary.

For example, in the case of optical, electro-optical and optoelectronic components, such as, for example, light-emitting diodes and laser diodes, optocouplers and photo-detectors, the semiconductor structural elements are enclosed by embedding compositions based on polymeric or polymerizable systems, the embedding compositions having to fulfill optical functions.

Because of the optical properties of the fillers employed to date, such as, for example, calcium fluoride, calcium carbonate, barium sulfate, amorphous silicic acid and the like, the amount of these employed is, however, currently limited. About 25% by weight is to be regarded as a still tolerable upper limit for the customary fillers. This lies in the fact that due to the different refractive indices of the inorganic filler and polymer matrix, the embedding composition becomes optically more inhomogeneous as the content of filler increases, and a considerable loss of scattered light occurs due to light scattering on the inorganic particles. The refractive index of the usual epoxy resin systems which are customary as embedding compositions for optical, electro-optical and optoelectronic components is about 1.5, that of calcium fluoride is 1.43 and that of spheroid particles of amorphous silicic acid is 1.42.

Other optical inhomogeneities, which sometimes cause even greater optical losses, arise from the fact that the inorganic particles usually employed tend to agglomerate, cannot be dispersed sufficiently uniformly in the casting resin and tend to undergo sedimentation in the non-cured state. Highly transparent embedding compositions which are free from scattered light are essential for uses such as in laser diodes and optocouplers.

The state of affairs is somewhat different in the case of light-emitting diodes for display purposes. These should have an intensive scattered light cone with a spatially uniform distribution of intensity coupled with a minimum intrinsic absorption of the embedding composition in the spectral range of the light-emitting diode emission. For this purpose, diffuser materials which are intended to ensure adequate light scattering are incorporated into the casting resin systems which function as embedding compositions. The diffuser materials employed are usually the inorganic fillers already mentioned, such as calcium fluoride, calcium carbonate, barium sulfate and amorphous silicic acid. The scattered light yield depends on the amount of particles added and their refractive index, particle shape, particle size and particle size distribution. The greatest possible difference between the refractive indices of the particle material and the polymer matrix material and particles which are as spherical as possible and have a narrow particle size distribution are favorable. However, the inorganic fillers usually employed as diffuser materials as a rule have non-uniform particle shapes and a relatively wide particle size distribution which is not constant from batch to batch. This leads to variations in the scattering properties of the light-emitting diodes and losses in the light yield. Inadequate dispersion properties and sedimentation of the particles in the resin system also cause such adverse effects.

There was therefore a need for improved inorganic fillers for use in polymeric or polymerizable systems, in particular in embedding compositions for optical, electro-optical and optoelectronic components.

It has now been found that monodisperse, non-porous, spherical particles based on $SiO_2$, $TiO_2$, $ZrO_2$, $Al_2O_3$, $V_2O_5$, $Nb_2O_5$ or mixed systems thereof are outstandingly suitable as fillers for such uses and advantageously solve the problems mentioned in several respects. Thus, on the one hand, the refractive index of the particles can be adjusted in a controlled manner to the refractive index of the organic matrix according to the use, depending on the choice of oxides, or composition in the case of mixed oxides, on which the inorganic particles are based, so that, for example, highly transparent materials are formed if the refractive indices are identical or, for example, highly light-scattering materials are formed if the refractive indices differ widely. On the other hand, the presence of these oxides or mixed oxides in the form of monodisperse, non-porous, spherical particles imparts to the organic matrix materials to which they are added outstanding optical properties. Surface modification of the particles with covalently bonded organic groups improves the dispersion properties in organic media, in particular homogeneous distribution and incorporation into polymeric materials, and reduces the tendency to agglomerate and undergo sedimentation.

The invention thus relates to the use of monodisperse, non-porous, spherical particles based on $SiO_2$, $TiO_2$, $ZrO_2$, $Al_2O_3$, $V_2O_5$, $Nb_2O_5$ or mixed systems thereof, which are optionally modified on the surface by covalently bonded organic groups, as fillers in organic matrix materials, the refractive index of the particles being adapted to the refractive index of the organic matrix according to the use.

The invention particularly relates to the use of such particles as refractive index-adapted fillers in polymeric or polymerizable systems which are preferably used as embedding compositions for optical, electro-optical and optoelectronic structural elements.

The invention furthermore relates to polymeric and polymerizable systems which comprise these particles as fillers, their use as embedding compositions for optical, electro-optical and optoelectronic structural elements and also the corresponding components.

The monodisperse, non-porous, spherical particles to be used according to the invention are known per se from the prior art. In principle, all oxide particles which can be obtained by hydrolytic polycondensation from alkoxide compounds of corresponding elements and are obtained in the form of monodisperse compact spherical particles by this process are suitable. The basic reaction conditions for the preparation of $SiO_2$ particles by hydrolytic polycondensation can be found, for example, in the publications W. Stöber et al. in J. Colloid and Interface Science 24, 62 (1968) and 30, 568 (1969) and U.S. Pat. No. 3,634,588. Other particles, such as, for example, $TiO_2$ or $ZrO_2$, can also be prepared by this method. However, the particles thus prepared often display wide standard deviations for the particle diameters and have a certain porosity.

Reference is made to EP 0 216 278, which discloses a correspondingly directed preparation process based on hydrolytic polycondensation, for the preparation of highly monodisperse, non-porous, spherical $SiO_2$ particles which have a standard deviation of not more than 5%. The core of this process, which is preferred for the preparation of the particles according to the present invention, is a two-stage procedure. In this process, a sol or a suspension of primary particles is first formed by hydrolytic polycondensation of tetraalkoxysilanes in an aqueous-alcoholic-ammoniacal medium and is then brought to the desired final size by metered addition of further tetraalkoxysilane.

The process according to EP 0 216 278 can be applied without reservation and with the same result to other oxides and also to mixed oxide systems.

An appropriate process for the preparation of various metal oxides in the form of spherical particles of narrow particle size distribution can be found in EP 0 275 688.

A corresponding two-stage process for the preparation of different metal oxides and also mixed oxides which moreover also have glycolic groups bonded chemically to the surface is described in EP 0 391 447.

For the use according to the invention of the monodisperse, non-porous, spherical metal oxide particles prepared by the abovementioned process as fillers in organic matrix materials, it is very largely a matter of the refractive index of the particles being adapted to the refractive index of the organic matrix according to the use.

Possible organic matrix materials are in principle all organic systems into which inorganic fillers are usually incorporated, in particular those in which the fillers additionally have to fulfill functional purposes. Polymeric and polymerizable systems which are processed to polymeric shaped articles or other corresponding products are of prime interest.

One of the fundamental possible uses is the production of optically homogeneous, highly transparent polymeric articles. Use-specific adaptation of the refractive index is to be understood in this case as meaning that the refractive indices of the filler and organic matrix are as far as possible identical.

The refractive indices of organic compounds and organic systems which are transparent to light, such as, in particular, resins and polymers, are as a rule in the range between 1.3 and 1.6. The refractive index of polymer materials is about 1.5.

With the inorganic oxides considered here, there is a certain choice of materials which have particular different refractive indices but with which the particular refractive index cannot be met exactly for all organic matrix materials. Thus, for example, monodisperse, non-porous, spherical $SiO_2$ particles have a refractive index of 1.42, corresponding $Al_2O_3$ particles have a refractive index of about 1.6, corresponding $ZrO_2$ particles have a refractive index of about 1.95 and corresponding $TiO_2$ particles have a refractive index of about 2.3.

Particles based on mixed oxides are the choice according to the invention for establishing other refractive index values. By combining preferably two or even more different oxides, particular refractive index values can be realized in a controlled manner. As a rough guideline for the resulting refractive index of such a mixed oxide system, the refractive index of the mixed oxide particles essentially results arithmetically from the refractive index of the pure oxides and their proportional ratio in the mixed oxide particle.

Such highly monodisperse, non-porous, spherical mixed oxide particles are prepared by the method described above, corresponding mixtures of alkoxides of the various elements being subjected to hydrolytic polycondensation in the simplest case.

The particular actual refractive index, depending on the nature and ratio of the amounts of the alkoxides employed and on the operating conditions chosen, can be easily determined or predetermined by routine in-process controls and/or preliminary empirical experiments.

For example, monodisperse, non-porous, spherical mixed oxide particles in which $SiO_2$ and $TiO_2$ are present in a ratio of approximately 80:20 and which have a refractive index of 1.52 can be obtained from a mixture of tetraethoxysilane and tetrabutoxytitanium in a molar ratio of 4:1. This refractive index furthermore corresponds exactly to that of a commercially available epoxy resin system which is often used as an embedding composition for optical, electrooptical and optoelectronic structural elements. The corresponding polycondensation of a mixture of tetraethoxysilane and tetrapropoxyzirconium in a molar ratio of 1:1 produces particles in which $SiO_2$ and $ZrO_2$ are present in a ratio of approximately 50:50 and which have a refractive index, corresponding to mathematical prediction, of 1.7.

In addition to metal oxide particles having a homogeneous distribution of the various oxides, mixed-phase particles can also be prepared. This is possible in a simple manner and by the two-stage process described above, for example, by forming primary particles from one oxide and then depositing another oxide or an oxide mixture in an epitaxial growth step. If the amount of oxide or mixed oxide formed in the epitaxial growth step predominates in the particle, this content largely determines the resulting refractive index. Here also, the dependence of the refractive index can be determined empirically by simple routine experiments.

Organic modification of the surface of the particles which may be advantageous for the particular intended use can be carried out in complete agreement with methods such as are known for the preparation of silica gels customary as chromatographic sorbents. The customary modifying agents are organoalkoxysilanes, such as, for example, methyltriethoxysilane, ethyltriethoxysilane, octyltriethoxysilane, octadecyltriethoxysilane and mono-or polyfluoroalkyltriethoxysilane, or silanes having functionalized organic groups which allow later further modification by covalent bonding in a known manner. In the latter case, those organoalkoxysilanes which contain functional groups with which covalent bonding into the polymer material can be achieved are preferred as fillers in polymeric or polymerizable systems in respect of the use of the particles according to the invention. Examples of these organoalkoxysilanes are trimethoxyvinylsilane, triethoxyvinylsilane and 3-glycidoxypropyltrimethoxysilane, 2-(3,4-epoxycyclohexyl)ethyltrimethoxysilane and [2-(3,4-epoxy-4-methylcyclohexyl)propyl]methyldiethoxysilane, as well as silanes with inorganic radicals carrying hydroxyl, carboxyl, epoxide and carboxylic acid ester groups.

Particles having such a modification on the surface are capable of participating, by means of the functional groups, in the reaction which effects curing of epoxy resin systems and of thereby being incorporated covalently into the polymer.

This organic modification can of course be carried out completely analogously with oxides other than $SiO_2$ and/or with corresponding organoalkoxides other [sic] elements.

From EP 0 216 278 mentioned first, it can also be seen that the particles can be modified organically by using organoalkoxysilanes in the matrix. Reference is made to the publication mentioned for further details in this context.

In the case of modification of the surface of the particles by covalently bonded organic groups, the properties of the particles in respect of spherical shape, non-porosity, monodispersity and refractive index are not influenced, while the advantageous properties associated with such modification can be perceived.

The particles can be advantageously employed according to the invention as fillers in organic matrix materials in all instances where use-specific adaptation of the refractive index coupled with maximum optical homogeneity is important. The particles to be employed according to the invention offer advantages through the possibility of controlled adaptation of the refractive index and extreme optical homogeneity of the matrix materials to which they are added, due to the presence of the particles in a highly monodisperse, compact and spherical form. The dispersion properties of the particles in organic media are decidedly improved and their tendency to undergo sedimentation is reduced by organic modification of the surface, a high uniform distribution resulting. The latter can be increased further by modification of the surface with groups which are capable of covalent bonding to the organic matrix material.

Examples of such uses are optically homogeneous, highly transparent polymeric shaped articles for optical purposes, such as, for example, optical components or polymeric embedding of semiconductor elements of electro-optical and optoelectronic components, in particular of laser diodes, optocouplers and photodetectors.

Particles having diameters of 50 to 1500 nm are employed for the uses mentioned. Particles in the size range from 100 to 1000 nm are preferred.

The polymer systems serving as matrix materials for these uses, their preparation and their processing are known per se and can easily be found from the relevant prior art.

Examples which may be mentioned of typical epoxy resin systems which are suitable as grit [sic] resins for embedding optoelectronic structural elements are those which are based, for example, on 3,4-epoxycyclohexanemethyl 3,4-epoxycyclohexanecarboxylate

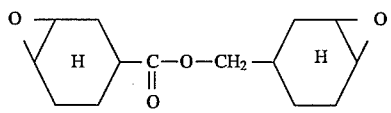

or on "bisphenol A epoxide"

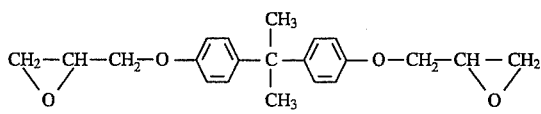

Corresponding commercially available grit [sic] resin systems usually also comprise curing agents and curing accelerators based on organic acid anhydrides and organic amines and, if appropriate, other additives in the mixture or as components to be added separately.

The particles according to the invention, preferably having an organic modification of the surface by means of 2-(3,4-epoxycyclohexyl)ethyltrimethoxysilane, are mixed with the corresponding grit [sic] resin in the desired amount and dispersed homogeneously therein. The particles can be present in the polymer material in an amount of 0.1 to about 40% by weight, depending on the intended use and function. The customary range for embedding compositions for optoelectronic components is 0.5–25% by weight, based on the total grit [sic] resin system. For embedding compositions for light-emitting diodes in which the particles have a diffuser function, their content can vary between 1 and 15% by weight.

Because of the particular advantages of the particles to be employed according to the invention, their content in the corresponding materials can also be increased significantly as required. The risk of stresses and cracking, which may threaten in the case of exposure to heat during operation of such components, can be reduced considerably in this way.

The particles can already be added as such to the polymer compositions and dispersed therein. Preferably, however, they are used in the form of a predispersion of the particles in a solvent compatible with the polymer system. Examples of dispersion media which can be employed, depending on the nature of the polymer system, are aliphatic alcohols, such as ethanol and butanol, acetone, glycol, diethylene glycol and polyglycols. Dispersion in polyglycols which are solid at room temperature is effected by heating to above the melting point. Predispersion of the particles as a "masterbatch" in the corresponding polymer system or a resin or polymer material compatible with the system is likewise preferred. The content of particles therein can be up to about 50% by weight.

When the particles according to the invention are used as a filling material in embedding compositions for light-emitting diodes where the particles have an optical diffuser function, a higher scattering intensity, an increase in the light yield and an improvement in the homogeneity of the scattered light cone compared with customary diffuser materials are to be observed. The efficiency of the light-emitting diodes is evaluated from the brightness or light yield, defined emission characteristics and a homogeneous luminous pattern.

Surprisingly, it has been found that light-emitting diodes with embedding compositions which comprise the particles according to the invention as diffusers have a scattering intensity which is about 25% higher and a light yield which is higher by a factor of about 2 compared with corresponding components comprising calcium fluoride as the diffuser material.

Use as fillers in highly transparent or also opaque films of plastic and in photographic emulsions is also a further possible use according to the invention of monodisperse, non-porous, spherical oxide particles of adapted refractive index.

In carrier films for magnetic recording tapes, these particles serve to improve the slip properties of the tapes, preferably if they have an organic modification on the surface.

EXAMPLE 1

A solution, adjusted to a temperature of 30° C., of 66.7 g (0.32 mol) of tetraethoxysilane and 27.2 g (0.08 mol) of tetrabutoxytitanium in 120 ml of ethanol is added all at once to a mixture, thermostatically controlled at the same temperature, of 520 ml of ethanol, 230 ml of water and 140 ml of 25% ammonia, while mixing intensively. The reaction mixture is stirred intensively for a further 15 seconds and then left to stand for one hour.

The resulting particles are present in dispersed form in the reaction mixture and can be isolated as a dry powder by centrifugation and, if appropriate, repeated taking up in water and renewed centrifugation and subsequent drying.

Dense spherical particles having a particle diameter of 500±15 nm are obtained. $SiO_2$ and $TiO_2$ are present in the particles in a ratio of approximately 80:20. The refractive index of the powder is determined as 1.52 microscopically by the known method of the shift of the Becke line.

EXAMPLE 2

A solution, adjusted to a temperature of 30° C., of 42 g (0.2 mol) of tetraethoxysilane and 65.5 g (0.2 mol) of tetrapropoxyzirconium in 150 ml of ethanol is added all at once to a mixture, thermostatically controlled at the same temperature, of 520 ml of ethanol, 230 ml of water and 140 ml of 25% ammonia, while mixing intensively. The reaction mixture is stirred intensively for a further 20 seconds and then left to stand for two hours, and is subsequently stirred again for two hours. The particles are isolated as in Example 1.

Dense spherical particles having a particle diameter of 500±20 nm are obtained. $SiO_2$ and $ZrO_2$ are present in the particles in a ratio of approximately 1:1. The refractive index is determined as 1.65.

EXAMPLE 3

90 ml (0.4 mol) of tetraethoxysilane are added to a mixture, thermostatically controlled at 30° C., of 600 ml of ethanol, 225 ml of walter and 140 ml of 25% ammonia, while mixing intensively. A dispersion of particles of average diameter 500 nm is obtained by this operation. The resulting particles are redispersed in 500 ml of ethanol. A mixture of 9 ml (0.04 mol) of tetraethoxytitanium and 400 ml of ethanol is added dropwise to this dispersion at 40° C. in the course of 2 hours and the mixture is then allowed to react for a further 2 hours. Epitaxial growth of $TiO_2$ on $SiO_2$ primary particles is achieved by this process. Working up is carried out in accordance with Example 1.

Dense spherical particles having a particle diameter of 500±20 nm are obtained. The refractive index is determined as 1.48.

EXAMPLE 4

The procedure is as in Example 3, except that the epitaxial growth step is carried out with 18.25 g (0.08 mol) of tetraethoxytitanium in 400 ml of ethanol. Dense spherical particles having a particle diameter of 490±15 nm and a refractive index of 1.51 are obtained.

EXAMPLE 5

The procedure is as in Example 3, except that the epitaxial growth step is carried out with 34.2 g (0.15 mol) of tetraethoxytitanium. Dense spherical particles having a particle diameter of 555±15 nm and a refractive index of 1.58–1.60 are obtained.

EXAMPLE 6

123 ml of tetraethoxysilane are added all at once to a mixture of 825 ml of ethanol, 308 ml of water and 93 ml of 25% ammonia which has been thermostatically controlled at exactly 35° C. The mixture is stirred vigorously, and the stirrer is switched off after 15 seconds. The reaction mixture is allowed to stand for one hour. Thereafter, a dispersion of seed particles 375 nm in size (SEM control) is present.

The seed dispersion is prepared for the epitaxial growth process by adding a further 308 ml of water and 93 ml of 25% ammonia solution. Thereafter, the dispersion is brought to a reaction temperature of 40° C., which is maintained exactly throughout the entire process.

An epitaxial growth mixture comprising 2213 ml of ethanol and 2213 ml of tetraethoxysilane is pumped continuously into the reaction mixture at a metering rate of about 7 ml/minute by means of a metering pump. When addition of the epitaxial growth mixture is complete, stirring of the entire dispersion at 40° C. is continued overnight. Subsequent SEM control shows particles of 1000 mm [sic] diameter.

For modification of the surface of the particles, the reaction mixture is concentrated, all the ethanol and the ammonia being distilled off. The now aqueous suspension is redispersed in about 1800 ml of 1-butanol, the water being distilled off azeotropically.

The monospheres are silanized in the butanolic dispersion. For this, the dispersion (~10.5 mol, based on solid $SiO_2$) is heated to 70° C., 10.4 g (4 mmol/mol of $SiO_2$) of 2-(3,4-epoxycyclohexyl)ethyltrimethoxysilane are added and the entire mixture is allowed to react at the same temperature overnight.

2900 ml of acetone are then added to the mixture as a solubilizing agent, and 5670 g of an epoxy resin based on 3,4-epoxycyclohexanemethyl 3,4-epoxycyclohexanecarboxylate (Araldit® CY 179; Ciba Geigy AG) are weighed in. Thereafter, the solvents are stripped off quantitatively; an approximately 10% dispersion of the spherical $SiO_2$ particles in the epoxy resin forms. This dispersion is the starting point for processing into, for example, epoxy casting resins for light-emitting diodes.

EXAMPLE 7

Light-emitting diode semiconductor elements are cast by the customary technique using the casting resin system from Example 6 and the resin is cured by means of heat.

Components which comprise the corresponding amount of $CaF_2$ as a diffuser in the embedding material serve as a comparison.

|  | Emission angle | Brightness |
| --- | --- | --- |
| Component according to the invention | 55° | 8.5 |
| Comparison component | 77° | 3.5 |

The components according to the invention show an approximately 25% higher scattering intensity and a light yield which is higher by a factor of about 2.

We claim:

1. A method of matching the refractive index of a filler to that of an organic matrix in which it is contained comprising a) preparing monodisperse, non-porous, spherical particles based on mixed oxides by combining two or more oxides selected from the group consisting of $SiO_2$, $TiO_2$, $ZrO_2$, $Al_2O_3$, $V_2O_5$ and $Nb_2O_5$ having a refractive index largely determined by the refractive indices of the oxides and their proportional ratio within said particles, b) optionally modifying the surfaces of said particles with covalently bonded organic groups, and c) incorporating said particles into organic polymeric or organic polymerizable systems, the refractive index of said particles based on mixed oxides being adapted to the refractive index of the organic matrix according to the desired characteristics of the intended use thereof.

2. A method according to claim 1, wherein the refractive index of said particles corresponds arithmetically to the refractive indices of the oxides in the proportion within said particles.

3. A method according to claim 1, wherein particles are organic matrix with substantially identical refractive indices and used to provide optically homogeneous, highly transparent polymeric shaped articles showing refractive indices in the range between 1.3 and 1.6.

4. A method according to claim 1, wherein particles and organic matrices with widely different refractive indices are used to provide highly light-scattering polymeric shaped articles.

5. A method according to claim 3 which provides optical, electro-optical or optoelectronic components.

6. A method of claim 1 wherein the index of the particles is matched to that of said matrix.

7. A method of claim 1 wherein the index of the particles is selected to be significantly different from that of said matrix.

8. A polymeric or polymerizable system comprising an organic matrix having a given refractive index and an inorganic filler, wherein the filler comprises preformed monodisperse, non-porous, spherical particles based on two or more oxides selected from group consisting of $SiO_2$, $TiO_2$, $ZrO_2$, $Al_2O_3$, $V_2O_5$ and $Nb_2O_5$ having a refractive index largely determined by the refractive indices of the oxides and their proportional ratio within said particles, said filler having a refractive index which is adapted to the refractive index of the organic matrix according to the desired characteristics of the intended use thereof.

9. A system according to claim 8, wherein said particles are modified on their surface by covalently bonded organic groups.

10. A system according to claim 9, wherein said particles are in covalently bonded form.

11. A system according to claim 8 which is an embedding composition for an optical, electro-optical or optoelectronic structural element.

12. An optical, electro-optical or optoelectronic component, comprising a system according to claim 8 as an embedding composition.

13. A system of claim 8 wherein the index of the particles is matched to that of said matrix.

14. A system of claim 8 wherein the index of the particles is selected to be significantly different from that of said matrix.

15. A component of claim 12 which is a light emitting diode and wherein the index of the particles is selected to be significantly different from that of said matrix.

* * * * *